Oct. 27, 1936.  J. ROSS  2,058,724
TROLLEY SHOE
Filed July 26, 1933
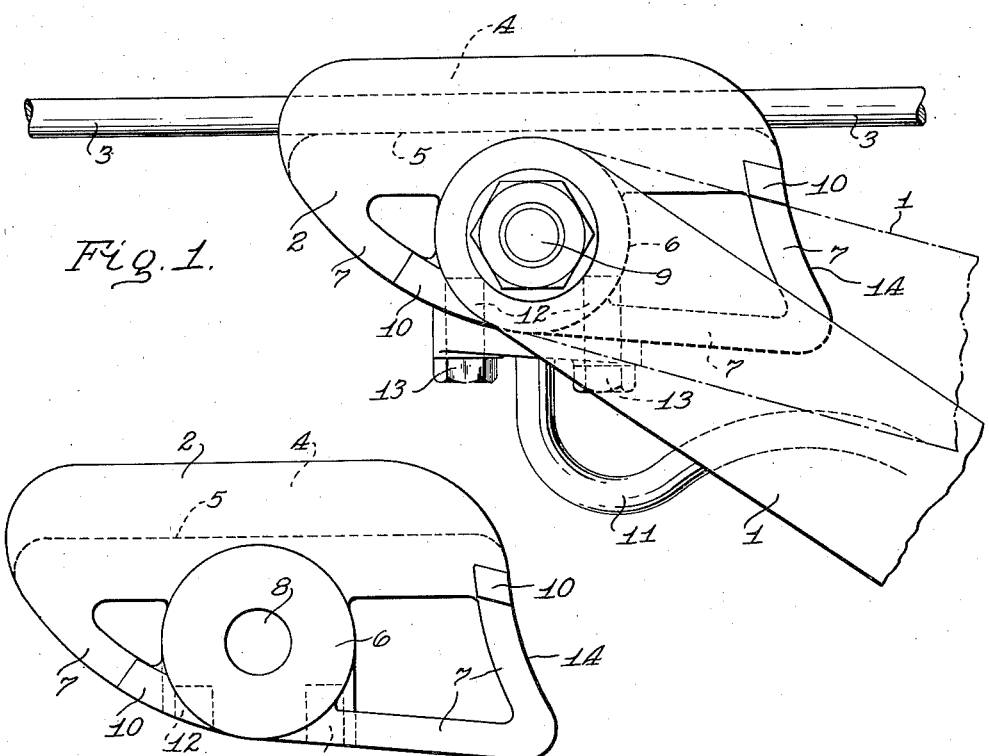
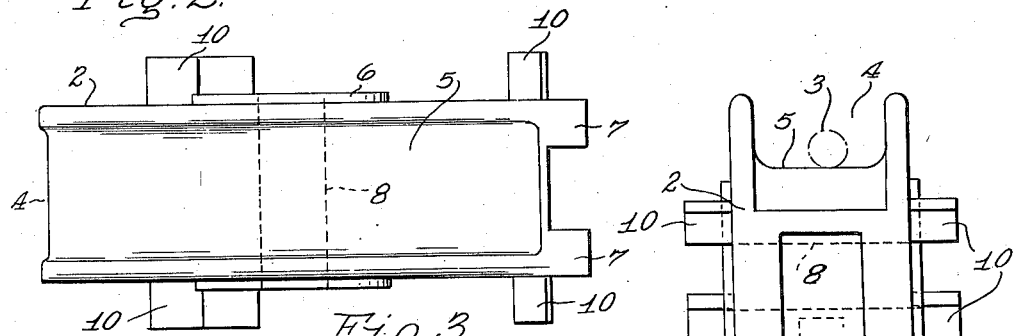
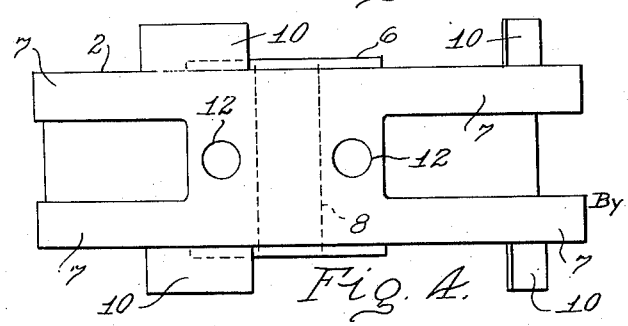
INVENTOR
John Ross
By
ATTORNEYS Patented Oct. 27, 1936

2,058,724

UNITED STATES PATENT OFFICE 2,058,724

TROLLEY SHOE

John Ross, Detroit, Mich., assignor to City of Detroit, Department of Street Railways Application July 26, 1933, Serial No. 682,242

1 Claim. (Cl. 191—59.1)

The present invention relates to a novel trolley shoe of a type particularly adapted for use on electrically driven vehicles for maintaining an electrical connection between an overhead conductor and a conductor leading to the motor of the vehicle.

The primary object of the present invention is to provide a shoe for attachment to a trolley harp, such as is ordinarily provided upon electrically driven vehicles, for engaging an overhead conductor such as a trolley wire, in a manner to prevent accidental displacement of the shoe from the wire as a result of irregularities in the wire, curved sections thereof, imperfect wire frogs and wire hangers, and high speed operation of the vehicle.

Another object of the present invention is to provide a shoe for a trolley harp which is constructed with a view of increasing the useful life thereof by distributing the wear, caused by sliding contact with an overhead conductor, over a greater area than is provided in conventional trolley shoes, without increasing the cost of manufacture and at the same time including features by which safety, durability and ease of assembling are secured. The shoe is constructed with a groove that receives the overhead conductor or wire, the groove being of a much greater comparative width than the diameter of the trolley wire, and having a flat bottom which is held in contact with the wire by resilient means associated with the pole that supports the harp to normally urge the same upwardly. Accordingly, the wire is not confined in a narrow groove in the shoe but may move laterally relative thereto, and during operation periodic side to side relative movement of the shoe and trolley wire takes place and the wearing away action resulting from frictional contact of the shoe with the wire as it moves along the wire during the travel of the vehicle upon which it is mounted is distributed over a surface several times greater than the diameter of the wire and thus greatly increases the useful life of the shoe.

With the above and other ends in view the invention consists in matters hereinafter set forth and more particularly pointed out in the appended claim, reference being had to the accompanying drawing, in which—

Figure 1 is a side elevation of a fragment of a trolley harp holding the present shoe in contact with a trolley wire;

Fig. 2 is a side elevation of the shoe;

Fig. 3 is a top plan of the shoe;

Fig. 4 is a bottom plan of the shoe, and

Fig. 5 is an end elevation of the shoe.

Like characters of reference are employed throughout to designate corresponding parts.

The numeral 1 designates a forked harp such as is ordinarily provided on the upper end of a trolley pole to support a current collector in the form of a shoe 2. The trolley pole may be of any standard construction commonly known in the electrically operated vehicle art wherein the pole is equipped with resilient means normally urging the pole to pivot upwardly so that the current collecting shoe 2 will contact with the current conductor which is illustrated as a trolley wire 3. It will, therefore, for the purpose of an understanding of the invention, be assumed that the harp 1 is provided with means (not shown) for holding the shoe 2 in contact with the wire.

The shoe is shaped substantially as illustrated, the upper portion being provided with a groove 4 having a straight or flat bottom as indicated at 5. It will be noted that the groove 4 is of a width considerably greater than the diameter of the wire 3. The shoe is provided with a bearing boss 6 that is joined integrally with the grooved portion of the shoe by webs 7 that facilitate rapid dissipation of heat, the boss being provided with a bore 8 through which a bolt 9 may be passed to pivotally secure the shoe in the harp. To prevent complete rotation, and to limit the rotation a specific amount for a specific purpose which will hereinafter be described, the shoe is provided with definitely spaced laterally projecting lugs 10 that are adapted to engage the sides of the supporting harp to limit the amount of pivotal movement of the shoe, on the bolt 9, relative to the harp.

The numeral 11 represents a conductor, that leads through the harp 1 and pole supporting the same to the motor of the vehicle upon which it is mounted, the shoe being equipped with screw-threaded bores 12 to receive bolts or screws 13 that positively secure the conductor 11 thereto.

The forward end 14 of the shoe slopes at an angle less than ninety degrees when the flat bottom 5 of the groove 4 is in a horizontal plane, as it will be ordinarily when in contact with the trolley wire 3. The sloped portion 14 extends upwardly from between the forks of the harp 1 so that in the event that the trolley shoe becomes accidentally displaced from the trolley wire while the vehicle with which it is associated is still moving there is an angular surface presented that facilitates sliding movement of the shoe and harp past span or guy wires arranged transversely relative to the trolley wire to support the same. Certain of the lugs 10 are so arranged that the lower edge of the angular surface 14 cannot project above the upper surface of the harp in a manner to provide a hook-like portion that could attach itself to span or guy wires to do damage to the same or to the shoe, harp or trolley pole.

The projecting lugs permit a range of relative movement of the shoe and harp between the positions illustrated in Figure 1 in full lines and in phantom lines, this range of movement being sufficient to facilitate a flat contact with the trolley wire in cases where the height of the trolley wire is varied.

In operation the shoe 2 is held in contact with the wire 3 and collects current therefrom to supply it to the motor of a vehicle. As the vehicle is propelled the trolley shoe slides along the wire, the sliding movement obviously causing considerable wear. Due to the manner in which the present shoe is provided with a groove having a wearing surface several times greater than the diameter of the wire, which permits relative side to side movement of the trolley and wire, the wear is distributed in a manner to increase the useful life of the shoe.

Although a specific embodiment of the present invention has been illustrated and described it is to be understood that various changes may be made in the details of construction without departing from the spirit of the invention, and such changes are contemplated.

What I claim is:

In combination, a trolley shoe comprised of a body formed with a groove extending throughout the length thereof, a boss formed integral with said body and having a transverse bore for the reception of a pivot pin, a pin received in said bore, a forked harp supporting the ends of said pin, laterally spaced apart webs uniting the rear end of said body with said boss, said webs having laterally projecting lugs adapted for engagement with said harp, laterally spaced apart webs uniting the forward end of said body with said boss, the last named webs having portions extending forwardly and downwardly from the forward edge of said body, and laterally projecting lugs on the last named webs adapted to engage said harp, said lugs being disposed on said webs whereby to maintain the lower ends of the forwardly and downwardly inclined portions between the forks of said harp.

JOHN ROSS.